United States Patent
Chapuis

(10) Patent No.: US 8,766,221 B1
(45) Date of Patent: Jul. 1, 2014

(54) ISOLATION SYSTEM FOR A BI-DIRECTIONAL COMMUNICATION BUS LINE

(75) Inventor: Alain Chapuis, Riedikon (CH)

(73) Assignee: Power-One, Inc., Camarillo, CA (US)

( * ) Notice: Subject to any disclaimer, the term of this patent is extended or adjusted under 35 U.S.C. 154(b) by 687 days.

(21) Appl. No.: 12/957,162

(22) Filed: Nov. 30, 2010

Related U.S. Application Data

(60) Provisional application No. 61/329,889, filed on Apr. 30, 2010.

(51) Int. Cl.
*G02B 27/00* (2006.01)

(52) U.S. Cl.
USPC ............ 250/551; 326/80; 340/2.26; 370/235; 370/282; 385/24; 385/27; 385/39; 398/82; 398/141; 398/142

(58) Field of Classification Search
USPC ............ 250/551; 326/80; 340/2.26; 370/235, 370/282; 385/24, 27, 39; 398/82, 141, 142
See application file for complete search history.

(56) References Cited

U.S. PATENT DOCUMENTS

| | | | | |
|---|---|---|---|---|
| 5,361,064 | A | * | 11/1994 | Hamer et al. ................. 340/939 |
| 5,793,754 | A | * | 8/1998 | Houldsworth et al. ....... 370/276 |
| 6,522,169 | B2 | | 2/2003 | Anderson et al. |
| 6,654,846 | B1 | | 11/2003 | Franca-Neto |
| 7,288,962 | B2 | * | 10/2007 | Taylor ............................. 326/68 |
| 7,359,433 | B1 | | 4/2008 | Culca |
| 7,359,640 | B2 | | 4/2008 | Onde et al. |
| 7,417,464 | B2 | | 8/2008 | Crawford |
| 2002/0114415 | A1 | * | 8/2002 | Lee et al. ....................... 375/354 |
| 2006/0075170 | A1 | * | 4/2006 | Behrendt et al. .............. 710/110 |
| 2006/0203834 | A1 | | 9/2006 | Augustinus |
| 2009/0031065 | A1 | | 1/2009 | Travers et al. |
| 2012/0025870 | A1 | * | 2/2012 | Ng et al. ......................... 326/63 |

OTHER PUBLICATIONS

Thoren, Mark. "Method Provides Fast, Glitch-Free Isolation of I2C and SMBus Signals" EDN Web. Jun. 24, 2004.
Analog Devices. "Hot Swappable Dual I2C Isolators" (ADuM1250/ADuM1251) www.analog.com.

* cited by examiner

*Primary Examiner* — Georgia Y Epps
*Assistant Examiner* — Kevin Wyatt
(74) *Attorney, Agent, or Firm* — Waddey Patterson; Mark J. Patterson; Gary L. Montle

(57) ABSTRACT

A system and method are provided for bidirectional communications between a master device and one or more slave devices. Each slave device is coupled to first and second opto-isolators which are effective to provide galvanic isolation of the slave device from the master device. An encoder circuit is coupled between the master device and the first opto-isolators. A decoder circuit is coupled between the master device and the second opto-isolators. The master device generates transmissions to the slave devices along a first low logic path including the encoder and the first opto-isolators, wherein the decoder and the second opto-isolators are non-responsive to signals on the first path. The slave devices generate transmissions to the master device along a second low logic path including the second opto-isolators and the decoder, wherein the encoder and the first opto-isolators are non-responsive to signals on the second path.

16 Claims, 6 Drawing Sheets

ISOLATION SYSTEM FOR A BI-DIRECTIONAL COMMUNICATION BUS LINE

CROSS-REFERENCES TO RELATED APPLICATIONS

This application claims benefit of the following patent application which is hereby incorporated by reference: U.S. Provisional Patent Application No. 61/329,889, filed Apr. 30, 2010.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to communications systems and methods. More particularly, the present invention relates to a system and method for providing bidirectional data communication between a master device and one or more isolated slave devices.

Serial communication buses are widely known for transferring data from one device to another or to multiple devices. Such a communication bus can be used for example to transmit configuration data from a system controller to a power supply or to receive monitoring data from the power supply itself. The communication bus can also be used to implement a communication channel within the power supply itself, for example to configure or monitor different outputs of the power supply.

In order to reduce the number of physical signal lines, a wired-AND bus configuration 100 in conjunction with open-drain drivers and a passive pull-up device can be used such as shown for example in FIG. 1. When the master and slave devices 102, 104 are not communicating the signal lines are pulled high and free for communication. Each device 102, 104 can subsequently pull the signal line to a low voltage level to initiate communications in accordance with a particular sequence in which the signal line is pulled low. Such configurations are used as known in the art for example in I²C buses or in the SMBus. These configurations are advantageous in that with an appropriate protocol data can be transmitted in both directions on the same signal line, without requiring explicit handshaking. Further, wired-AND configurations are not limited to one transmitter and one receiver, as several receivers may be connected to the same signal line.

When such a bus is used within a power supply to transfer data from an on-board power supply controller and several output modules such as for example in a modular AC-DC power supply, then it becomes necessary to provide a galvanic isolation between the transmitter and each of the receivers. Solutions to provide a galvanic isolation for a wired-AND communication bus have been proposed and are well known in the art. An example of such a solution using cross-coupled isolators IC120, IC121 associated with each of master and slave devices 112, 114 and coupled along a communications bus 116 is shown in the communications bus configuration 110 of FIG. 2.

The difficulty in circuits such as that shown in FIG. 2 is to make sure that the cross-coupled isolators 120 which are used to transfer the communication data in both directions do not form a latch. This typically requires adding some amount of circuitry in order to be able to distinguish in which direction the data is sent so that only one of the opto-isolators 120 is used at the time, thus avoiding a condition where data such as for example an output low drive signal transferred in one direction gets immediately sent back and blocks the entire communication channel by holding the input low even after the output low drive signal is no longer present. A signal line "latched" in such a manner may require complex circuitry to break the loop, or may cause further potential problems such as oscillation where multiple lines are held low and then released at the same time.

Referring now to a circuit example 200 such as shown in FIG. 3, in cases where more than two devices are connected to the same bus, the proposed isolator configurations are becoming onerous in their complexity. A pair of isolators 220 are provided for each secondary device 216, and an encoder/decoder pair 218, 222 are further provided on either end of each isolator pair 220 to facilitate the bidirectional communications.

However, in many cases the first device 212 will be configured as a master device 212 talking to, and getting response from, the other devices 214. The first device 212 could be for example a power supply controller 212, whereas the secondary devices 214 could be PWM controllers 214 for a specific isolated power supply output of the power supply system. In this case there is also usually no need to communicate from one output device 214 to another output device 214. There will only be communications along the bus 216 directly between the power supply controller 212 and the individual PWM controllers 214. It would be desirable in these cases to simplify the isolation scheme and reduce circuit duplication.

BRIEF SUMMARY OF THE INVENTION

Systems and methods for bidirectional data communication are provided herein in accordance with various embodiments of the present invention. In various aspects, the systems and methods include a single encoder/decoder circuit in an isolated master to slave bus architecture using a single wire for bidirectional data communication. A master device in accordance with the systems and methods of the present invention may transmit data to each of one or more slave devices coupled to the communications bus, while each slave may individually transmit data to the master device.

Briefly stated, in an embodiment a bidirectional communications system is provided with a bidirectional transmission medium coupled between a master device and a slave device and having a high logic state generated in association with no data transmissions between the master device and the slave device. A first data transmission path extends along the transmission medium from the master device to the slave device via an encoder circuit coupled to the master device and a first opto-isolator circuit, and the first data transmission path is associated with a first low logic state generated by the master device. A second data transmission path extends along the transmission medium from the slave device to the master device via a second opto-isolator circuit and a decoder circuit coupled to the master device, and the second data transmission path is associated with a second low logic state generated by the slave device. A diode is coupled between the first opto-isolator circuit and the slave device to prevent activation of the second opto-isolator circuit in response to a first low logic state generated by the master device. The encoder circuit is arranged to prevent activation of the first opto-isolator circuit in response to a second low logic state generated by the slave device.

In another embodiment of the bidirectional communications system of the present invention, a master device and a slave device are coupled to a bidirectional transmission medium. The master device detects a logic state for the transmission medium as being high or low in comparison with first and second threshold voltages, with a high logic state associated with a voltage on the transmission medium above the second threshold voltage and a low logic state associated with a voltage on the transmission medium equal to or below the second threshold voltage. Where a high logic state is detected, the master device can then generate a data transmission by pulling the voltage on the transmission medium from above the second threshold voltage to below both of the first and second threshold voltages. The slave device also detects a high or low logic state, and where a high logic state is detected can then generate a data transmission by pulling the voltage on the transmission medium low with respect to the second threshold voltage.

First and second semiconductor switches are coupled on a first side to the master device and on a second side to the slave device along the transmission medium, and the switches are effective to provide galvanic isolation of the associated slave device from the master device. A single encoder circuit is coupled on a first end to the master device and coupled on a second end to the first semiconductor switch. A single decoder circuit is coupled on a first end to the master device and coupled on a second end to the second semiconductor switch. The encoder circuit is responsive only to a voltage on the transmission medium below the first threshold voltage to activate the first semiconductor switch, wherein the voltage on the second side of the first semiconductor switch is pulled low. The second semiconductor switch is activated when the slave device pulls the voltage on the transmission medium low with respect to the second threshold voltage level, wherein the voltage on the first side of the second semiconductor switch is pulled low via the decoder circuit.

In another embodiment, a method is provided for bidirectional communications between a master device and one or more slave devices along a bidirectional transmission medium. The master device is galvanically isolated from the one or more slave devices by first and second opto-isolators coupled to each slave device. The first opto-isolators are further coupled to the master device via an encoder circuit, and the second opto-isolators further coupled to the master device via a decoder circuit.

A first step of the method is providing a high voltage along the transmission medium during which a high logic state is detectable by the master device. A second step is detecting by the one or more slave devices a low logic state associated with a first low voltage level, wherein the slave devices are configured to receive data transmissions from the master device along a first path which includes the encoder circuit and the first opto-isolators. A third step includes preventing the second opto-isolators from becoming activated during data transmissions from the master device. A fourth step includes detecting by the master device a low logic state associated with a second low voltage level, wherein the master device is configured to receive data transmissions from the slave devices along a second path which includes the decoder circuit and the second opto-isolators. A fifth step includes preventing the first opto-isolators from becoming activated during data transmissions from the slave devices.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The term "isolation circuit" as used herein may generally refer to at least: an opto-isolator, optical isolator, photocoupler, optocoupler, photoMOS and various equivalent alternatives as known in the art to provide galvanic isolation between elements of a circuit.

Figure 1:
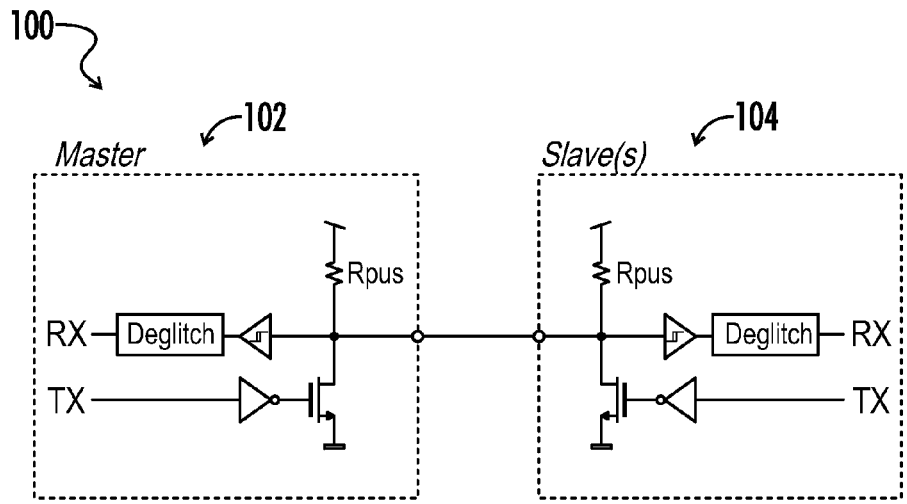
FIG. 1 is a block diagram showing a communications bus topology as previously known in the art.
Figure 2:
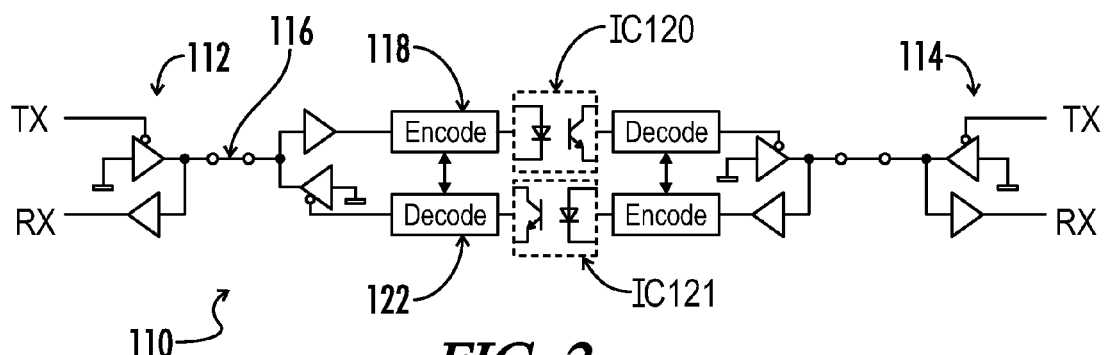
FIG. 2 is a block diagram showing a communications bus topology as previously known in the art.
Figure 3:
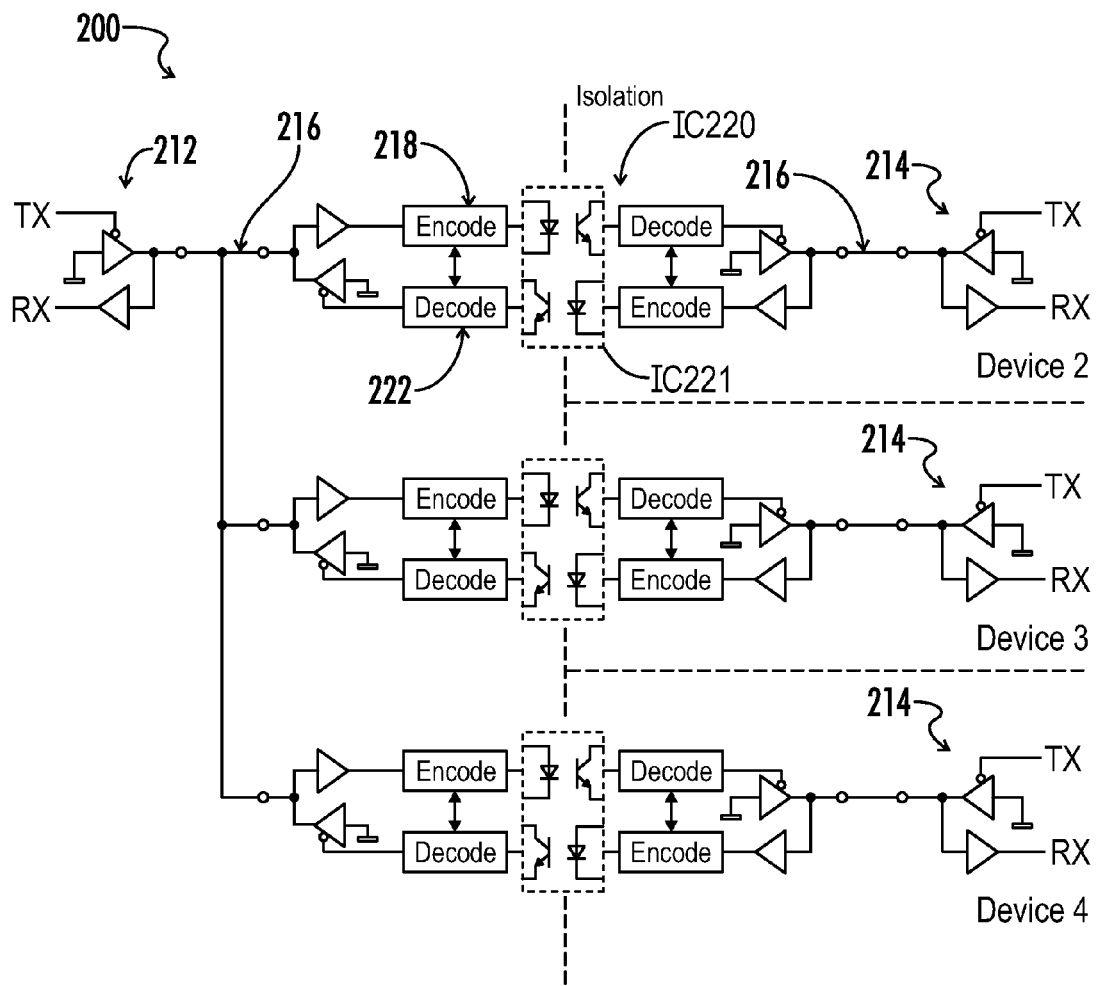
FIG. 3 is a block diagram showing a communications bus topology as previously known in the art.
Figure 4:
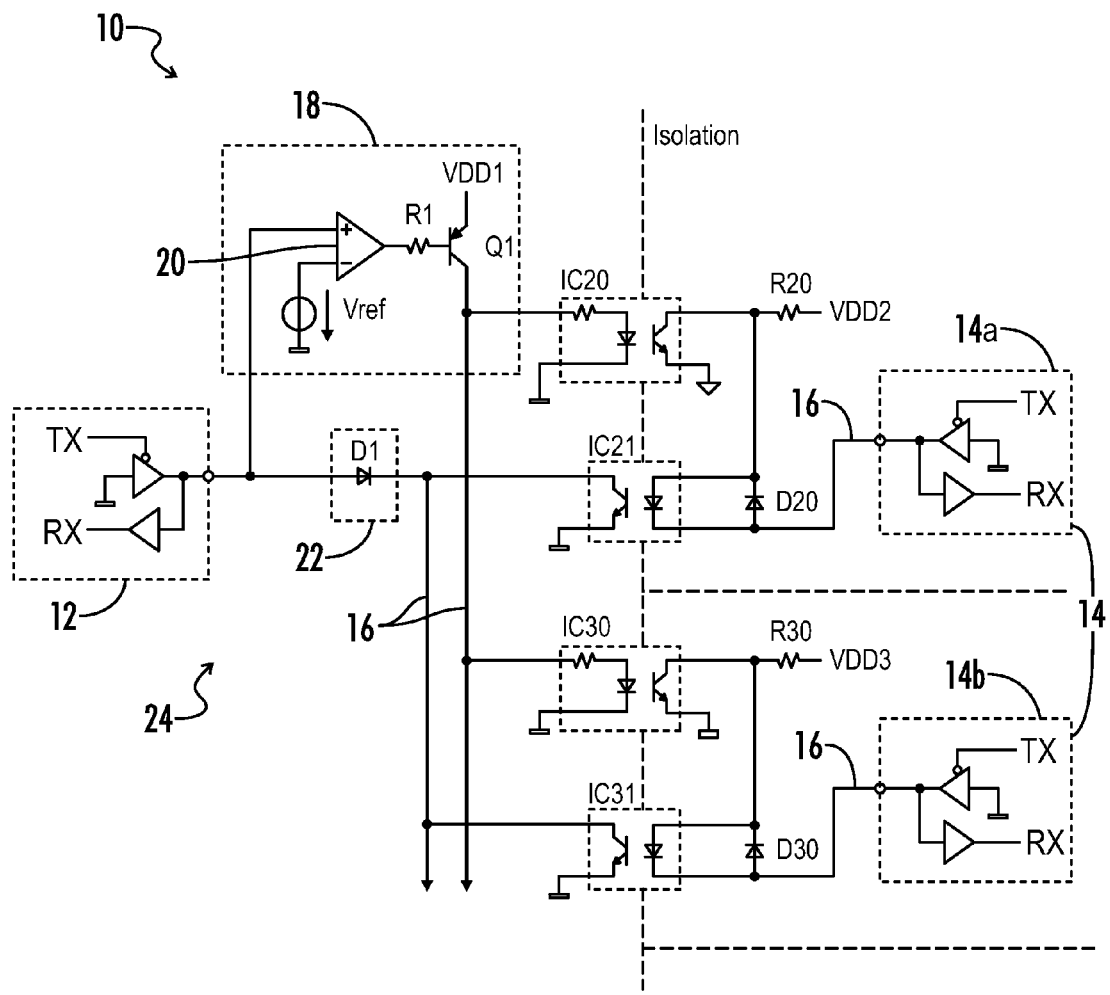
FIG. 4 is a block diagram showing an embodiment of a communications bus topology in accordance with the present disclosure.
Figure 5A:
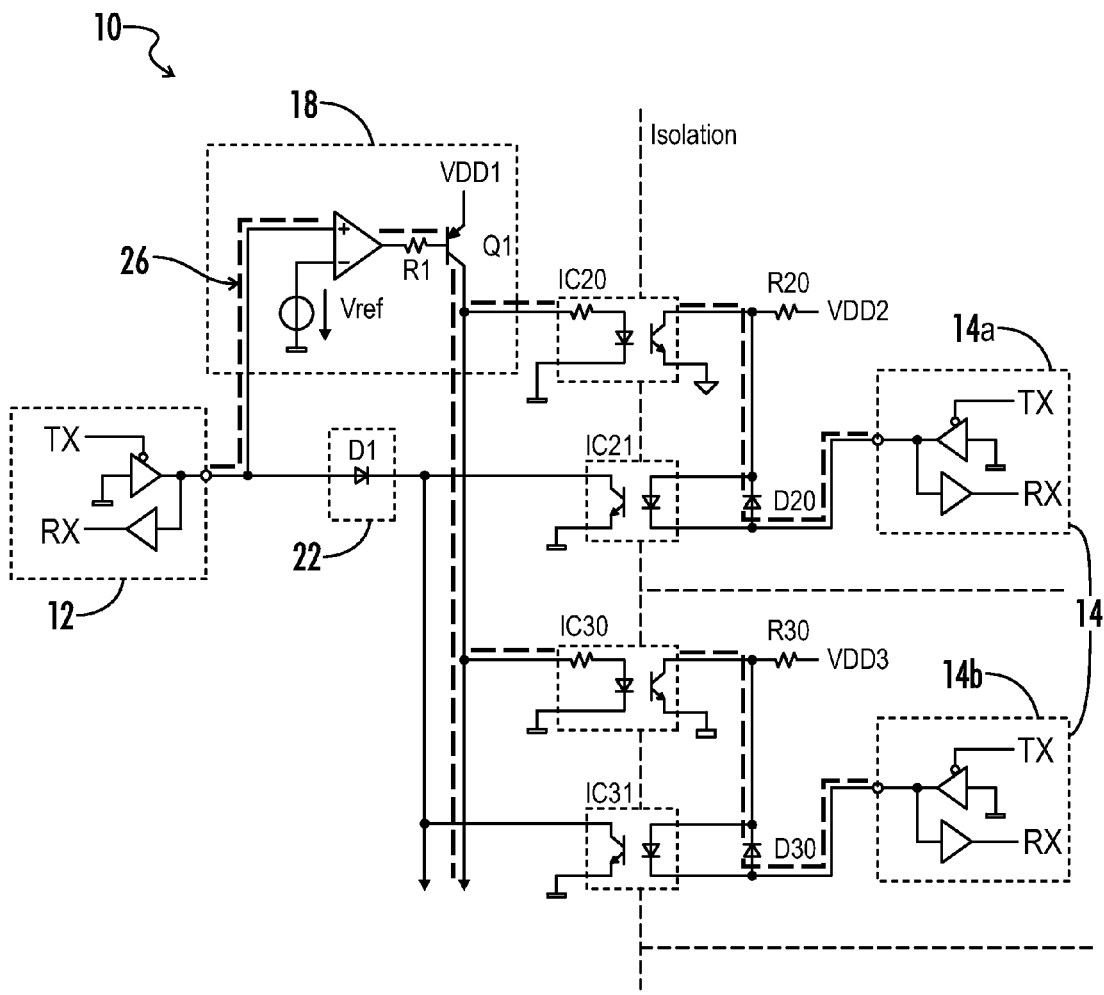
FIGS. 5a-5b are block diagrams showing first and second communications paths, respectively, in the communications bus topology of FIG. 5.
Figure 5B:
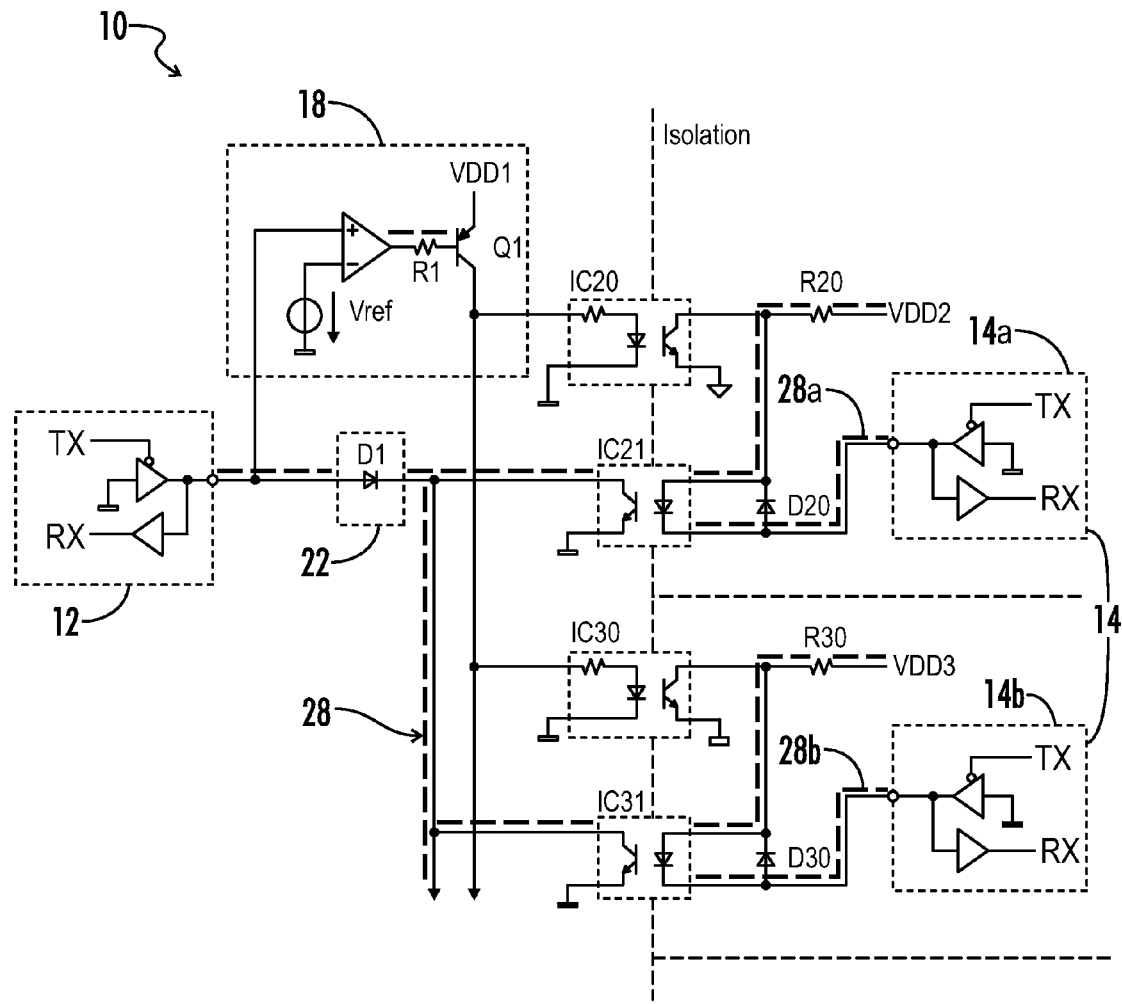
Figure 6:
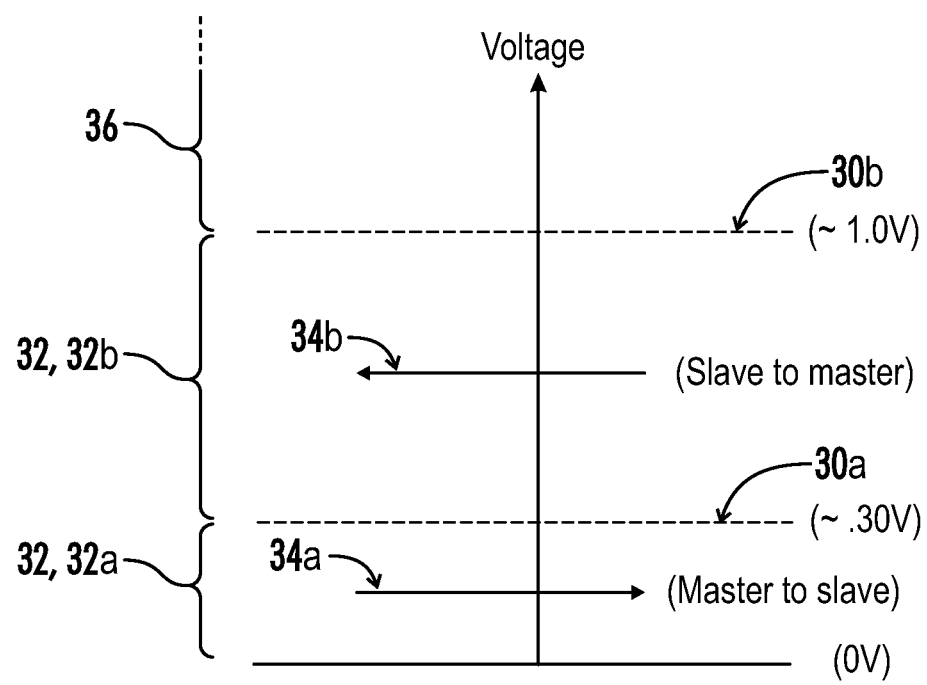
FIG. 6 is a graphical diagram showing logic states, voltage levels and voltage thresholds in accordance with an embodiment of the present disclosure.

Referring generally to FIGS. 4-6, various embodiments of a system and method for providing bidirectional data communication may be herein described. Where the various figures may describe embodiments sharing various common elements and features with other embodiments, similar elements and features are given the same reference numerals and redundant description thereof may be omitted below.

Referring to an embodiment of a bidirectional data communication system 10 as shown in FIG. 4, a master device 12 may be coupled to one or more slave devices 14 via a bidirectional transmission medium 16.

In a particular embodiment the master device 12 may be for example a power supply controller and the one or more slave devices 14 may be for example PWM controllers for specific isolated power outputs in a modular power supply. Various alternative forms and types of master devices 12 and slave devices 14 are anticipated within the scope of the present invention, however, where one or more slave devices 14 communicate in a bidirectional fashion with a master device 12 but without requiring communication between the one or more slave devices 14 themselves.

The two slave devices 14a, 14b shown in FIG. 4 are labeled as such with respect to the particular example given, but additional slave devices 14 are anticipated within the scope of the present invention, and various descriptions of the system 10 may refer to the one or more slave devices individually as 14a, 14b, etc. or collectively as slave device 14. Each slave device 14 within the scope of the present invention may be described interchangeably with respect to each other slave device, unless otherwise stated herein, with respect to their communications protocol and configuration. It may be understood, however, that the slave devices 14 are not necessarily limited to identical configurations with respect to functions outside of the scope of the present invention, such as for example their control functions where the slave device is a point-of-load regulator or the like.

In various embodiments the bidirectional transmission medium 16 may be formed of a single wire by which bidirectional data communications may take place between the master device 12 and the slave devices 14 using the configuration and methods described herein.

Referring again to FIG. 4, an encoder circuit 18 is coupled on a first end to the master device 12 along the transmission medium 16. In an embodiment as shown, the encoder circuit 18 is formed of a comparator 20 having a first input coupled to the master device 12 and a second input coupled to a reference voltage source providing a reference voltage Vref, and having an output coupled via a resistor R1 to the base of semiconductor switch Q1. The semiconductor switch Q1 in the example shown is a PNP bipolar junction transistor having its emitter coupled to voltage source VDD1, but various alternative switches Q1 may potentially be used within the scope of the present invention.

A decoder circuit 22 may be further coupled on a first end to the master device 12. The decoder circuit 22 in an embodiment as shown in FIG. 4 is formed of a diode D1 having its anode coupled to the master device 12.

The master device 12, the encoder circuit 18 and the decoder circuit 22 may collectively be referred to as a first stage 24 or master stage 24 of the bidirectional bus configuration of the present invention.

In various embodiments the master device 12 is further coupled to the one or more slave devices 14 via first and second galvanic isolation circuits ICx0, ICx1. Referring specifically to an exemplary first slave device 14a, a first galvanic isolation circuit IC20 is coupled on a first end to the encoder circuit 18 and coupled on a second end to the slave device 14a. A second galvanic isolation circuit IC21 is coupled on a first end to the decoder circuit 22 and coupled on a second end to the slave device 14a. Both of the isolation circuits IC20, IC21 are effective to provide galvanic isolation between the master device 12 and the slave device 14a.

In various embodiments such as shown in FIG. 4, the first isolation circuit IC20 may be an opto-isolator module IC20 having, for example, a light-emitting diode (LED) or photodiode on an input end and a photodetector on an output end. The LED or photodiode has an anode coupled to the switch Q1. The photodetector in various embodiments may take on various forms as known in the art which are effective to provide opto-isolation with respect to the input LED. However, referring in particular to FIG. 4, the photodetector in a particular embodiment is an NPN phototransistor having its collector coupled to a node between the slave device 14 (via diode D20) and voltage source VDD2 (via resistor R20).

Likewise, the second isolation circuit IC21 may in various embodiments be an opto-isolator module IC21 having on an input end an LED or photodiode with its anode coupled to the cathode of the diode D20, and its cathode coupled to the anode of diode D20. A phototransistor on the output end of the second opto-isolator IC21 has its collector coupled to the master device 12 via the decoder circuit 22.

In various embodiments current-blocking circuitry may be provided with respect to the second opto-isolator IC21 which effectively prevents current from entering and activating the opto-isolator IC21 when the transmission medium 16 is pulled low for communications from the master device 12 to the slave device 14a, but permits the opto-isolator IC21 to be activated when the transmission medium 16 is pulled low by the slave device 14a. Referring to the embodiment shown in FIG. 4, a diode D20 is coupled in series between the first opto-isolator IC20 and the slave device 14a, with the anode of diode D20 coupled to the slave device 14a and the cathode of diode D20 coupled to the first opto-isolator IC20. The diode D20 is further coupled in parallel with the second opto-isolator IC21.

The current-blocking circuitry, in the embodiment shown as the diode D20, and the slave device 14a may collectively be referred to as a second stage 24 or slave stage 24 of the bidirectional bus configuration of the present invention.

Referring now to FIGS. 5a, 5b and 6, operation of the bidirectional communications system 10 in accordance with various embodiments of the present invention may be described in some detail.

When no communications are being transmitted from either of the master device 12 or the one or more slave devices 14, the transmission medium 16 may be described as being in or having a high logic state 36. In various embodiments the high logic state 36 may be associated with a particular voltage range greater than first and second voltage thresholds 30a, 30b, and detectable by the master device 12 and in various embodiments also by the one or more slave devices 14 as a high logic state 36, wherein communications may freely be initiated. In an embodiment as shown in FIG. 6 and further described herein, the high logic state 36 may be associated with a bus voltage or a voltage on the transmission medium of greater than the second threshold voltage 30b, this second threshold voltage being higher than the voltage drop of decoder 22, or in a particular example about 1.0 V, although the amount may vary depending on the circuitry associated with the system and various alternative ranges are well within the scope of the present invention.

The master device 12 and the one or more slave devices 14 may be generally configured therefore to detect a low logic state 32 of the transmission medium 16 when a bus voltage or voltage on the transmission medium is detected by the device receivers (RX) as being less than or equal to the second threshold voltage 30b.

Referring to FIG. 5a, the master device 12 may be generally configured to initiate data communications along a first data transmission path 26 by pulling the voltage on the transmission medium 16 to a voltage which is less than or equal to the second threshold voltage 30b such that the transmission medium 16 is detectable by the master 12 and slave devices 14 as being in a low logic state 32, and may more particularly be configured to pull the voltage on the transmission medium 16 to a first low voltage 34a which is less than the first threshold voltage 30a such that the transmission medium 16 is further detectable by the encoder circuit 18 as being in low logic state 32a. The encoder circuit 18 may be further configured to detect low logic state 32a only when the transmission medium 16 is pulled to a voltage less than the first threshold voltage 30a (which is less than the second threshold 30b) and not detect low logic states 32, 32a when the transmission medium 16 has a voltage greater than the first threshold voltage 30a, whether below the second threshold voltage 30b or otherwise. In other words, the encoder circuit 18 may be configured in various embodiments to substantially equate the second low voltage (logic) state 32b with the high voltage (logic) state 36.

The voltage level to which the master device 12 pulls the transmission medium 16, and further defining the first low voltage 34a, may in an embodiment as shown in FIG. 5a be further determined in accordance with the reference voltage Vref on the second input of the comparator 20 of the encoder circuit 18. The comparator 20 and by extension the encoder circuit 18 generally thereby detects a low logic state 32a for the transmission medium 16, or alternatively stated a portion of the transmission medium 16 coupled to the first input of the comparator 20, where the first input has been pulled lower than the reference voltage Vref. The reference voltage Vref in this context may further be equal to the first voltage threshold 30a, and may in various embodiments be defined as a voltage being lower than the voltage drop of the diode in the decoder circuit 22 (e.g., ~0.6 V), but higher than the first voltage level 34a, or about 0.3V in the present example.

Still referring to FIG. 5a, when the comparator 20 of the encoder circuit 18 detects low logic state 32a for the transmission medium 16, the comparator 20 turns on the switch Q1 (in the example shown a PNP transistor Q1) via resistor R1 coupled to the base of the switch Q1, thereby in turn activating the one or more first opto-couplers IC20, IC30 . . . ICx0 which may be coupled to the collector of the switch Q1. The remainder of this description with regards to the first transmission path may refer to a portion of the first transmission path relative to a first slave device 14a from among the one or more slave devices 14, the operating features being substantially equivalent with respect to each branch or portion of the transmission medium 16 relative to each slave device 14.

Upon activation of the first isolation circuit IC20, the opto-isolator output may pull low the transmission medium via the diode D20 to below the second threshold voltage 30b. As the bus receiver associated with the slave device 14a is configured to detect a low logic state 32 even where the transmission medium 16 is pulled low via a diode, the slave device 14a may detect either of logic state 32a, 32b as being a low logic state 32 generally. The second isolation circuit IC21, or alternatively stated the second opto-isolator IC21, will remain inactive, as the forward biased diode D20 prevents any current flow into the opto-coupler IC21.

Referring now to FIG. 5b, the one or more slave devices 14 may be configured to initiate data communications along alternative data transmission paths 28a, 28b by pulling the transmission medium 16 low. For the remainder of this particular description, a second data transmission path 28, 28a will be described with respect to the first slave device 14a as described above, with additional data transmission paths 28, 28b . . . 28x being associated respectively with any additional slave devices 14b . . . 14x as may be further included in the bidirectional communications system 10 of the invention, and with the understanding that the protocol with respect to any one of the one or more slave devices 14 may be substantially equivalent and that further description may be omitted as unnecessary.

When the slave device 14a pulls the transmission medium 16 low, or more particularly pulls the transmission medium 16 to below the first threshold voltage, a current path from source VDD2 through resistor R20 and the second opto-isolator IC21 opens and activates the second opto-isolator IC21. The second opto-coupler IC21 output subsequently pulls low the transmission medium 16 in the master stage of the system 10 via the decoder circuit 22.

As the master device 12 may be configured to detect a low logic state 32 even where the transmission medium 16 has been pulled low via the diode D1 in the decoder circuit 22, or in other words the transmission medium 16 has been pulled to a voltage level less than the second threshold voltage 30b, the master device 12 detects the logic low state 32b where the second opto-isolator IC21 has been activated.

Since the transmission medium 16 is pulled low in this case via the diode D1 in the decoder circuit 22 and not by the master device 12 itself, the voltage on the transmission medium 16 does not drop below the first threshold voltage 30a and therefore the encoder circuit 18 does not detect low logic state 32a. In other words, the voltage on the transmission medium 16 and at the first input of the comparator 20 of the encoder circuit 18 does not drop below the reference voltage Vref at the second input of the comparator 20 of the encoder circuit 18 and the encoder output remains unchanged. Therefore, the first isolation circuit IC20 or opto-isolator IC20 remains inactive during data transmissions initiated from the slave device 14a.

The previous detailed description has been provided for the purposes of illustration and description. Thus, although there have been described particular embodiments of the present invention of a new and useful "Isolation System for a Bi-directional Communication Bus Line," it is not intended that such references be construed as limitations upon the scope of this invention except as set forth in the following claims.

What is claimed is:

1. A bidirectional communications system comprising:
    a bidirectional transmission medium coupled between a master device and a slave device and having a high logic state associated with no data transmissions between the master device and the slave device;
    a first data transmission path along the transmission medium from the master device to the slave device via an encoder circuit coupled to the master device and a first opto-isolator circuit, the first data transmission path associated with a first low logic state generated by the master device;
    a second data transmission path along the transmission medium from the slave device to the master device via a second opto-isolator circuit and a decoder circuit coupled to the master device, the second data transmission path associated with a second low logic state generated by the slave device;
    a diode coupled between the first opto-isolator circuit and the slave device and arranged to prevent activation of the second opto-isolator circuit in response to a first low logic state generated by the master device,
    wherein said encoder circuit is arranged to prevent activation of the first opto-isolator circuit in response to a second low logic state generated by the slave device;
    wherein the first low logic state is associated with a voltage on the transmission medium having a value less than a first predetermined threshold voltage;
    wherein the second low logic state is associated with a voltage on the transmission medium having a value less than or equal to a second predetermined threshold voltage, the second threshold voltage being greater than the first threshold voltage;
    the encoder circuit further comprising a comparator having a first input coupled to the master device via the transmission medium and a second input coupled to receive a reference voltage approximately equal to the first threshold voltage;

an output of the comparator is coupled to the base of a switch, the comparator output arranged to turn on the switch when the comparator detects a voltage at the first comparator input of less than the first threshold voltage; and wherein turning on of the switch provides a current path arranged to activate the first opto-isolator circuit.

2. The system of claim 1, wherein the decoder circuit further comprises a diode having its anode coupled to the master device and its cathode coupled to the second opto-isolator.

3. The system of claim 2, wherein the second threshold voltage is approximately equal to the voltage drop across the diode of the decoder circuit.

4. The system of claim 1, further comprising one or more additional slave devices, each additional slave device associated with an additional data transmission path to the master device, wherein each additional data transmission path to the master device is via the decoder circuit.

5. A bidirectional communications system comprising:

a master device coupled to a bidirectional transmission medium, the master device configured to detect a logic state for the transmission medium as being high or low, said detected high logic state associated with a voltage on the transmission medium above first and second threshold voltages and said detected low logic state associated with a voltage on the transmission medium equal to or below the second threshold voltage, and generate a data transmission from the master device by pulling the voltage on the transmission medium from above the second threshold voltage to below the first threshold voltage;

a slave device coupled to the bidirectional transmission medium, the slave device configured to generate a data transmission from the slave device by pulling the voltage on the transmission medium low with respect to the second threshold voltage level;

first and second semiconductor switches coupled on a first side to the master device and on a second side to the slave device along the transmission medium, the switches effective to provide galvanic isolation of the associated slave device from the master device;

an encoder circuit coupled on a first end to the master device and coupled on a second end to the first semiconductor switch along the transmission medium;

a decoder circuit coupled on a first end to the master device and coupled on a second end to the second semiconductor switch along the transmission medium, wherein the encoder circuit is responsive only to a voltage on the transmission medium below the first threshold voltage to activate the first semiconductor switch, wherein the voltage on the second side of the first semiconductor switch is pulled low with respect to the second threshold voltage, and further wherein the second semiconductor switch is activated when the slave device pulls the voltage on the transmission medium low with respect to the second threshold voltage, wherein the voltage on the first side of the second semiconductor switch is pulled low via the decoder circuit.

6. The system of claim 5, wherein the master device is configured to generate a first low logic signal to the slave device by pulling an input to the encoder circuit from a voltage associated with a high logic state to a first low voltage detectable by the encoder circuit as being associated with a low logic state, to which the encoder circuit is responsive to activate the first semiconductor switch, wherein the transmission medium coupled to the slave devices is pulled from the first voltage to a second low voltage detectable by the slave device as being associated with a low logic state.

7. The system of claim 6, wherein the slave device is configured to generate a second low logic signal to the master device by activating the second semiconductor switch, wherein the transmission medium coupled to the master device is pulled from the high voltage to the second low voltage which is detectable by the master device as being associated with a second low logic state.

8. The system of claim 5, wherein the first and second semiconductor switches further comprise first and second opto-isolators, respectively.

9. The system of claim 8, wherein the second opto-isolator is prevented from being activated when the first opto-isolator is activated by a diode arranged to prevent current flow along the first transmission path and into the second opto-isolator.

10. The system of claim 9, wherein the decoder circuit further comprises a diode having an anode coupled to the master device and a cathode coupled to the second opto-isolator.

11. The system of claim 10, wherein the encoder circuit further comprises a comparator having a first input coupled to the master device and a second input coupled to a receive a reference voltage having a value between the first and second low voltages, wherein the comparator output is unchanged when the first comparator input is pulled to the second low voltage but detects a low logic state when the first comparator input is pulled to the first low voltage.

12. The system of claim 11, wherein the reference voltage is approximately half the voltage drop of the diode in the decoder circuit.

13. The system of claim 12, wherein the master device and the slave devices further comprise a receive input and a transmit output, and are further configured to detect a low logic state in response to detecting either of the first low voltage or the second low voltage at the receive input, wherein the transmit output is disabled for the duration of the low logic state.

14. The system of claim 5, wherein the bidirectional transmission medium further comprises a single wire.

15. A method of providing bidirectional communications between a master device and one or more slave devices along a bidirectional transmission medium, the master device galvanically isolated from the one or more slave devices by first and second opto-isolators coupled to each slave device, the first opto-isolators further coupled to the master device via an encoder circuit, the second opto-isolators further coupled to the master device via a decoder circuit, the method comprising:

providing a high voltage along the transmission medium during which a high logic state is detectable by the master device;

detecting at the one or more slave devices a low logic state, wherein the one or more slave devices are configured to receive data transmissions from the master device along a first path comprising the encoder circuit and the one or more first opto-isolators;

preventing the second opto-isolators from becoming activated during data transmissions from the master device;

detecting at the master device a low logic state, wherein the master device is configured to receive data transmissions from the one or more slave devices along a second path comprising the decoder circuit and the one or more second opto-isolators;

preventing the first opto-isolators from becoming activated during data transmissions from the one or more slave devices; and wherein the step of preventing the second opto-isolators from becoming activated during data transmissions from the master device further comprises providing a current-blocking circuit between the first opto-isolator and the slave device, the current-blocking circuit further arranged to prevent current flow into the second opto-isolator while the first opto-isolator is activated.

16. The method of claim 15, further comprising the steps of detecting at the encoder circuit a low logic state associated with a first low voltage level generated by the master device, wherein the encoder circuit is configured to associate a voltage greater than the first low voltage level with a high logic state;

activating by the encoder circuit the first opto-isolator responsive to detecting the low logic state; and preventing by the encoder circuit activation of the first opto-isolator when a high logic state associated with the first low voltage level or the high voltage level is detected.

* * * * *